G. L. Templeton.
Hinge.

No. 70,762. Patented Nov. 12, 1867.

Witnesses:
A. Maynard
J. S. Meriam

Inventor:
G. L. Templeton
By his Attorney
G. S. Chapin

United States Patent Office.

G. L. TEMPLETON, OF PIERCETON, INDIANA.

Letters Patent No. 70,762, dated November 12, 1867.

---

IMPROVEMENT IN GATES.

---

The Schedule referred to in these Letters Patent and making part of the same.

---

TO ALL WHOM IT MAY CONCERN:

Be it known that I, G. L. TEMPLETON, of Pierceton, in the county of Kosciusko, in the State of Indiana, have invented an improved Gate; and I do hereby declare that the following is a full and exact description thereof, reference being had to the accompanying drawings, and to the letters of reference marked thereon, making a part of this specification, in which—

Figure 1:
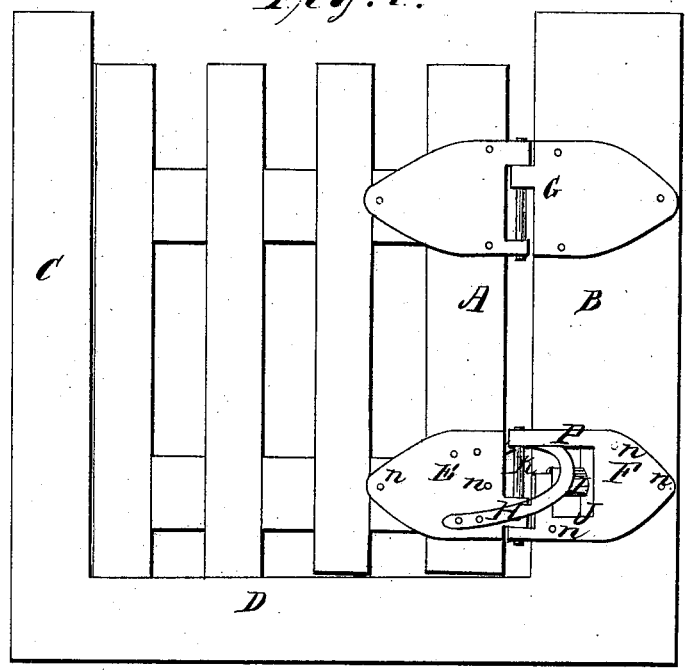

Figure 1 is an elevation of my improvement in gates.

Figure 2:
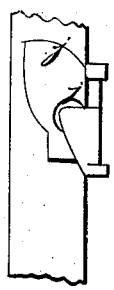

Figure 2, an elevation of that part of the hinge attached to the post, showing also how the post is cut away to give room for the hinge to operate.

Figure 3:
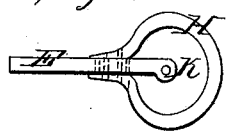

Figure 3, a plan view of that part of the hinge attached to the gate.

The nature of my invention consists in the use of a circular spiral cam for supporting a gate attached to the inner wing of a hinge, and made to run on a roller fitted into a recess made in the outer wing, by which means the gate is made to rise when being opened, and to swing shut by its own weight.

In order to give a correct understanding of my invention, I have marked corresponding parts with similar letters, and will now give a detailed description.

A represents the gate, and B C D the frame in which it is hung. H represents the spiral cam, made of round wire, (or cast iron, as most convenient,) and rigidly attached to the inner wing E of the hinge, as seen at figs. 1 and 3. The object of making the cam of round wire is for the purpose of securing a thin bearing on the roller I, and also one which will wear on a line corresponding with the curve of the wire. The outer wing F has a deep recess, J, made for the purpose of giving room for the cam H to work in frame B, and thus permit the gate A to be hung closely to it, as seen at fig. 1.

This latter arrangement is especially desirable where gates are to be hung in tight fences, and gives additional strength to the hinges, as they may be secured closely to their joints.

Another important advantage is derived from the recess J, and consists in the upper shoulder P forming a stop, and preventing the gate from being raised up and thrown from its hinges. A roller, I, is arranged to operate in recess J, and support the weight of the gate in the usual manner, and the pin K is made long enough to allow the gate to rise and fall according to the pitch of cam H. J', figs. 1 and 2, represents a recess made in frame B, corresponding with recess J in the outer wing F of the hinge, and is of such size as will allow the gate A to readily open and shut, but not so as materially to diminish the strength of frame B.

It will be seen that the gate is only intended to open at right angles, and to shut with a moderate force by means of its own weight.

I consider the roller I a common device, and that cams have been made to run upon the same for similar purposes; I therefore do not claim them broadly, but what I do claim, and desire to secure by Letters Patent, is—

The cam H, made of round wire, or similar material, and secured to the inner wing E, in combination with the outer slotted wing F, roller I, gate A, and frame B, having a slot, J', arranged and operating substantially as and for the purposes set forth.

G. L. TEMPLETON.

Witnesses:
  A. HAYWARD,
  J. L. MERIAM.